May 28, 1929. L. E. YOUNIE 1,715,111
PICKER
Filed March 14, 1927
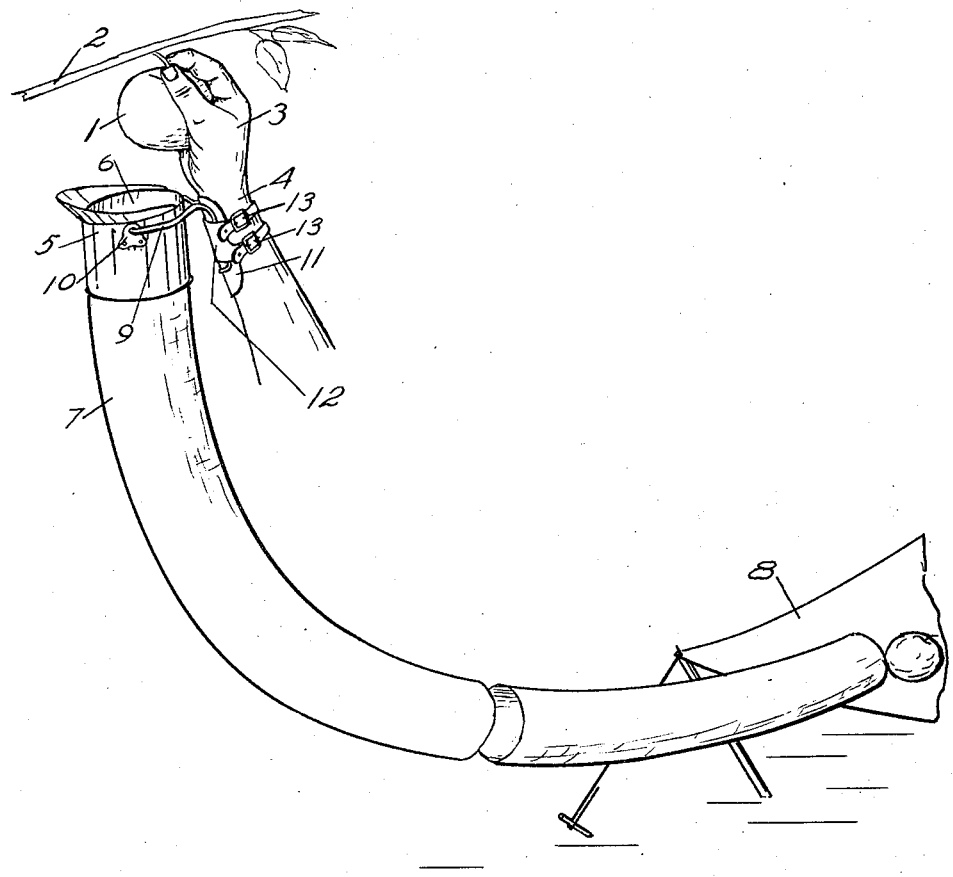
Lewis E. Younie
INVENTOR.
BY
ATTORNEYS.

Patented May 28, 1929.

1,715,111

UNITED STATES PATENT OFFICE.

LEWIS EDWARD YOUNIE, OF LA FAYETTE, CALIFORNIA.

PICKER.

Application filed March 14, 1927. Serial No. 175,169.

The speed of picking fruit ordinarily is hampered by the necessity of the operator after plucking the fruit conveying the fruit plucked to some receptacle arranged for receiving the fruit. The present invention is designed to obviate this loss in time and thus reduces the labor incident to the gathering of fruit. Features and details of the invention will appear from the specification and claims.

A preferred embodiment of the invention is illustrated in the accompanying drawing showing an elevation of the device.

1 marks the fruit, 2 a limb supporting the same, 3 the hand of an operator grasping the fruit in pulling the same, and 4 the wrist of the operator.

A receptacle 5 having an opening 6 is arranged directly under the palm of the operator. The receptacle is preferably bottomless and has attached thereto a fabric tube 7 leading to a receiving sheet 8. It will be understood that the tube may extend into any convenient receptacle.

A bail 9 is pivotally secured to the receptacle 5, the bail extending through perforated ears 10 at the sides of the receptacle. This bail forms a support for the receptacle and extends from a wrist plate 11. The wrist plate 11 is secured in a wrist band 12 secured by buckles 13 on the wrist of the operator.

In picking fruit the operator simply pulls the fruit and with the opening directly under the palm drops it directly into the receptacle from which it passes through the tube to the receiving sheet, or other means of reception.

While I have shown but a single device, it will be understood that it may be duplicated on both hands of the same operator, if desired. This device permits the hand-picking of the fruit which is less liable to bruise it than where the fruit is picked with mechanical means and if the fruit is started without bruising through the tube it will be delivered to the receptacle by reason of the slight retarding effect of the tube without injury. By this means the picker is entirely relieved of the movement of the hand from the point of pulling the fruit to a convenient receptacle, or opening for receiving the fruit.

What I claim as new is:—

1. In a picker, the combination of a fruit receptacle; a support pivotally secured to the receptacle; and means attaching the support to an operator's wrist.

2. In a picker, the combination of a fruit receptacle; a support pivotally secured to the receptacle comprising a bail pivoted at each side of the receptacle; a wrist plate to which the bail is secured; and means attaching the plate to an operator's wrist.

3. In a picker, the combination of a fruit receptacle; a support pivotally secured to the receptacle; means attaching the support to an operator's wrist; and a flexible tube extending from the receptacle and receiving fruit and conveying the same from the receptacle to a place of deposit.

4. In a picker, the combination of a fruit receptacle; a support pivotally secured to the receptacle comprising a bail pivoted at each side of the receptacle; a wrist plate to which the bail is secured; means attaching the plate to an operator's wrist; and a flexible tube extending from the receptacle and receiving fruit and conveying the same from the receptacle to a place of deposit.

In testimony whereof I have hereunto set my hand.

LEWIS EDWARD YOUNIE.